Patented Mar. 18, 1952

2,589,273

UNITED STATES PATENT OFFICE 2,589,273

PROCESS FOR DEOXYGENATING AND ISOMERIZING A FISCHER-TROPSCH STOCK

Charles W. Montgomery and William I. Gilbert, Oakmont, Pa., assignors to Gulf Research & Development Company, Pittsburgh, Pa., a corporation of Delaware No Drawing. Application September 17, 1948, Serial No. 49,845

11 Claims. (Cl. 260—450)

This invention relates to the catalytic treatment of synthetic motor fuels, such as motor fuels obtained by the reaction of carbon monoxide and a hydrogen-containing gas, and more particularly, to a process for deoxygenating while simultaneously isomerizing a synthetic motor fuel containing olefins and oxygenated compounds to obtain a motor fuel of increased anti-knock rating.

The catalytic hydrogenation of carbon monoxide produces a wide variety of substances, the predominance of a particular substance depending upon the particular operating conditions employed in carrying out the synthesis. In general, there are two types of materials which may be produced by the synthesis, one of which may be classed as oxygenated compounds, and the other as hydrocarbons. The hydrocarbons thus produced, however, may consist predominantly of straight chain olefins which are not good motor fuel constituents in that their octane rating is low. Motor fuels synthesized by the reaction of carbon monoxide and hydrogen invariably contain some oxygenated compounds which are formed concurrently with the hydrocarbons. These oxygenated compounds which may comprise alcohols, aldehydes, ketones and acids are undesirable in a motor fuel in that they greatly decrease its anti-knock rating. Numerous attempts have been made to hydrogenate carbon monoxide to produce only hydrocarbons, but invariably small amounts of oxygenated compounds are formed.

It is, therefore, an object achieved by this invention to provide a process for deoxygenating while simultaneously isomerizing a relatively low octane number synthetic motor fuel containing olefins and oxygenerated compounds obtained by the reaction of carbon monoxide and a hydrogen-containing gas to a motor fuel of increased anti-knock rating.

This and other objects achieved by this invention will become apparent in the following detailed description thereof.

We have discovered that the octane rating of a synthetic motor fuel containing olefins and oxygenated compounds, such as a motor fuel prepared by the reaction of carbon monoxide and hydrogen, can be greatly improved by passing said fuel over a catalyst comprising alumina impregnated with anhydrous hydrogen chloride. We have found that when a motor fuel of the above type is so treated, the oxygenated compounds are converted to olefins, the straight chain olefins are isomerized to branched chain olefins, terminal double bonds are shifted toward the center of such unsaturated molecules, and the resulting motor fuel has enhanced anti-knock properties. The octane ratings of the leaded motor fuels are correspondingly increased so that a deoxygenated, isomerized, leaded sample has a rating several units higher than an untreated sample containing the same amount of lead. Therefore, the process is not merely a substitute for tetraethyl lead, but permits the reaching with the stocks contemplated of octane numbers impossible to obtain by lead addition alone. The reaction conditions include a temperature range of from 300° to 600° C. and a space velocity of from 0.1 to 20 volumes of charge per hour per volume of catalyst and pressures from 0 to 200 pounds per square inch. Optimum results are obtained in the preferable range of 375° to 425° C., 0.3 to 1.3 space velocity, and atmospheric pressure. The process is characterized by liquid yields in excess of 95 per cent and usually 97 to 99 per cent.

The catalyst of the present process comprises alumina impregnated with anhydrous hydrogen chloride. According to one embodiment of the invention, a suitable catalyst may be prepared by heating a body of activated alumina pellets at 250° C. until the pellets are substantially dry. The pellets are then cooled to room temperature after which anhydrous hydrogen chloride is passed through the body of pellets for about 2 hours. Heat is then applied to the pellets and anhydrous hydrogen chloride is passed through the body of pellets for another hour at which time the temperature is allowed to reach 400° C. The catalyst is then purged with nitrogen gas for about 15 minutes. The catalyst thus prepared contains about 4.0 volumes of anhydrous hydrogen chloride per volume of catalyst. This measurement, of course, refers to volumes of gaseous anhydrous hydrogen chloride under standard conditions of temperature and pressure.

As the catalyst is used, a deposit of carbonaceous material is laid down upon the catalyst surface reducing its activity and necessitating periodical burn-offs and reactivating with anhydrous hydrogen chloride. Burning-off can be accomplished with air, maintaining the burn-off temperature below the sintering temperature of the catalyst, i. e., below about 1100° F. After the catalyst has been burned off, reactivation is accomplished by passing 1 to 20 volumes of anhydrous hydrogen chloride per volume of catalyst over the catalyst at room temperature and then gradually raising the temperature to that of the reaction while continuing the contacting with anhydrous hydrogen chloride. When the reaction temperature is reached, the treating with anhydrous hydrogen chloride in discontinued and excess hydrogen chloride is swept out with an inert gas. The catalyst is then ready to be contacted with charge. The physical shape of the alumina appears to have little effect upon the catalytic activity, equally successful results being obtained with ⅛" pellets and 8 to 14 mesh granules.

The length of the cycle between carbon burn-offs may be 3 to 30 volumes of charge per volume of catalyst with little sacrifice in octane improvement at 15 to 20 volumes per volume of catalyst. Reactivation need not accompany each burn-off because the activity of the catalyst decreases very gradually.

The use of an alumina catalyst which has been freshly impregnated with anhydrous hydrogen chloride invariably introduces a quantity of chlorine in the treated product. The chlorine thus introduced has a detrimental effect upon the lead susceptibility of the product. It is therefore desirable when using a catalyst which has been freshly treated with anhydrous hydrogen chloride, to pass the deoxygenated-isomerized motor fuel over a substance which will remove the chlorine without otherwise materially affecting the product. Bauxite at 200° to 500° C. and space velocities of 0.1 to 30 volumes of gasoline per hour per volume of bauxite is an effective means for removing chlorine. We have found that if the catalyst is burned off and not reactivated no chlorine appears in the product. Therefore, it may be desirable in a continuous process to by-pass the bauxite treating step at the end of the first cycle.

The following examples are given as illustrative of the present invention, but it is to be understood that the invention is not restricted thereto. In each of the following examples, the charge stock was produced by the reaction of hydrogen and carbon monoxide over an iron catalyst and consisted of the raw debutanized gasoline fraction. The bromine number which is an indication of the olefin content was obtained in accordance with the procedure described in Ind. Eng. Chem. 18, 821 (1926) by A. W. Francis. The neutralization number which is an indication of the acid content was obtained in accordance with the procedure described in 1947 ASTM manual, method D-663-46T. The aldehyde number which is an indication of the aldehyde and ketone content was obtained in accordance with the procedure described in J. Am. Chem. Soc., 57, 57 (1935) by Bryant and Smith. The hydroxyl number which is an indication of the alcohol content was obtained in accordance with the procedure described in J. Am. Chem. Soc. 57, 61 (1935) by Bryant and Smith.

*Example I*

3.2 volumes of charge stock were passed over one volume of ⅛ inch alumina pellets activated with anhydrous hydrogen chloride at a temperature of 400° C., atmospheric pressure, and 0.49 vol./vol. hour space velocity. The resulting product was treated with bauxite at 278° C., atmospheric pressure and a space velocity of 0.93. The product was then debutanized to make it comparable with the charge. The following data were obtained on the charge and the product:

|  | Charge | Product |
|---|---|---|
| Gravity, ° A. P. I | 64.7 | 65.2 |
| Bromine No | 80.7 | 89.6 |
| Neutralization No | 1.45 | 0.01 |
| Aldehyde No | 16.2 | 2.2 |
| Hydroxyl No | 22.1 | <0.1 |
| Octane No. (CFR-Research): |  |  |
| Clear | 44.8 | 65.6 |
| +3 cc. T. E. L | 69.8 | 83.8 |

It can be seen from the above data, particularly the neutralization number, the aldehyde number and the hydroxyl number, that the charge stock was substantially completely deoxygenated while the olefins were simultaneously isomerized as evidenced by an increase of over 20 units in the clear octane number.

After the run was completed, the catalyst was swept free of hydrocarbon gases with nitrogen. With the catalyst still at approximately 400° C., air was passed slowly through the catalyst bed. The temperature of the catalyst was maintained betweeen about 450° and 525° C. until all of the carbon was removed from the catalyst. The catalyst was then ready for further use.

*Example II*

3.2 volumes of charge stock were passed over one volume of catalyst obtained from Example I. The reaction was carried out at 449° C., atmospheric pressure, and a space velocity of 0.5 The resulting product was treated with bauxite at 284° C., atmospheric pressure, and a space velocity of 1.02. After the run was completed, the catalyst was regenerated as described in Example I. The product was debutanized to make it comparable with the charge. The following data were obtained on the charge and the product:

|  | Charge | Product |
|---|---|---|
| Gravity, ° A. P. I | 64.7 | 65.2 |
| Bromine No | 80.7 | 91.2 |
| Neutralization No | 1.45 | 0.04 |
| Aldehyde No | 16.2 | 2.3 |
| Hydroxyl No | 22.1 | 0.3 |
| Octane No. (CFR-Research): |  |  |
| Clear | 44.8 | 64.5 |
| +3 cc. T. E. L | 69.8 | 83.0 |

Deoxygenation of the charge was substantially complete as evidenced by the neutralization number, the aldehyde number and the hydroxyl number. An increase of nearly 20 units in the clear octane number is sufficient proof to establish the isomerization of the olefins.

*Example III*

3.2 volumes of charge stock were passed over one volume of regenerated catalyst obtained from Example II. The reaction was carried out at 401° C., atmospheric pressure, and a space velocity of 0.49. The resulting product was treated with bauxite at 287° C., atmospheric pressure, and a space velocity of 0.99. The product was then debutanized to make it comparable with the charge. The following data were obtained on the charge and the product:

|  | Charge | Product |
| --- | --- | --- |
| Gravity, ° A. P. I. | 64.7 | 65.6 |
| Bromine No. | 80.7 | 91.1 |
| Neutralization No. | 1.45 | 0.03 |
| Aldehyde No. | 16.2 | 2.5 |
| Hydroxyl No. | 22.1 | 0.0 |
| Octane No. (CFR-Research): |  |  |
| Clear | 44.8 | 63.3 |
| +3 cc. T. E. L. | 69.8 | 82.4 |

Deoxygenation of the charge stock was substantially complete as indicated by the neutralization, aldehyde and hydroxyl numbers. The octane number increase is sufficient to establish the isomerization of the olefins.

As mentioned above, reactivation is not necessary after each burn-off because the activity of the catalyst decreases very gradually. Gradual decrease in catalyst activity can be seen from a study of the octane numbers for the above examples, in which the catalyst was used successively from one example to the next. Between each example the catalyst was burned-off but not reactivated. The CFR-Research (clear) octane numbers for Examples I, II and III were 65.6, 64.5 and 63.3, respectively. The leaded octane numbers were 83.8, 83.0 and 82.4, respectively.

As pointed out above, it may be desirable in some instances to by-pass the bauxite treating step. A study of the "octane-barrel" relationship is one means for determining when the bauxite treating step may be by-passed. For instance, bauxite treating may give a product of improved color and perhaps a slightly higher octane number than could be obtained by omitting the bauxite treating, but the loss in product during the treating step coupled with the cost of the treating may make such treating economically unsound. In order to illustrate this point, a charge stock having a leaded octane number (3 cc. T. E. L.) of 69.8 was treated with a burned-off anhydrous hydrogen chloride impregnated alumina catalyst at 400° C. and a space velocity of 0.5. The resulting product had a leaded octane number (3 cc. T. E. L.) of 80.2. When the same charge stock was similarly treated and the product thus obtained further treated with bauxite at 284° C. and a space velocity of 1.0, a final product having a leaded octane number (3 cc. T. E. L.) of 83.0 was obtained. The liquid recovery from the bauxite treating step, however, was only 97 per cent. The octane-barrel relationship of the product and the bauxite treated product is 8020 and 8051, respectively. From this it can be seen that the slight increase in octane-barrels obtained by the bauxite treating is hardly sufficient to justify the cost of such treating.

This invention has been described with particular reference to certain embodiments and specific examples, but is not limited to such embodiments or examples except as defined in the appended claims:

We claim:

1. A process for deoxygenating while simultaneously isomerizing a synthetic motor fuel containing olefins and oxygenated compounds obtained by the reaction of carbon monoxide and a hydrogen-containing gas which comprises passing said motor fuel at a temperature of from 300° to 600° C. over a catalyst comprising alumina impregnated with anhydrous hydrogen chloride.

2. A process for deoxygenating while simultaneously isomerizing a synthetic motor fuel containing olefins and oxygenated compounds obtained by the reaction of carbon monoxide and a hydrogen-containing gas which comprises passing said motor fuel at a temperature of from 300° to 600° C. over a catalyst comprising alumina impregnated with anhydrous hydrogen chloride, at a space velocity of from 0.1 to 20 volumes of said motor fuel per hour per volume of catalyst.

3. A process for deoxygenating while simultaneously isomerizing a synthetic motor fuel containing olefins and oxygenated compounds obtained by the reaction of carbon monoxide and a hydrogen-containing gas which comprises passing said motor fuel at a temperature of from 300° to 600° C. over a catalyst comprising alumina impregnated with anhydrous hydrogen chloride at a space velocity of from 0.1 to 20 volumes of said motor fuel per hour per volume of catalyst at a pressure not in excess of 200 pounds per square inch.

4. A process for deoxygenating while simultaneously isomerizing a synthetic motor fuel containing olefins and oxygenated compounds obtained by the reaction of carbon monoxide and a hydrogen-containing gas which comprises passing said motor fuel at a temperature of from 375° to 425° C. over a catalyst comprising alumina impregnated with anhydrous hydrogen chloride.

5. A process for deoxygenating while simultaneously isomerizing a synthetic motor fuel containing olefins and oxygenated compounds obtained by the reaction of carbon monoxide and a hydrogen-containing gas which comprises passing said motor fuel at a temperature of from 375° to 425° C. over a catalyst comprising alumina impregnated with anhydrous hydrogen chloride at a space velocity of from 0.3 to 1.3 volumes of motor fuel per hour per volume of catalyst and substantially atmospheric pressure.

6. A process for deoxygenating while simultaneously isomerizing a synthetic motor fuel containing olefins and oxygenated compounds obtained by the reaction of carbon monoxide and a hydrogen-containing gas which comprises passing said motor fuel at a temperature of from 300° to 600° C. over a catalyst comprising alumina impregnated with about 4 volumes of anhydrous hydrogen chloride per volume of alumina.

7. A process for deoxygenating while simultaneously isomerizing a synthetic motor fuel containing olefins and oxygenated compounds obtained by the reaction of carbon monoxide and a hydrogen-containing gas which comprises passing said motor fuel over a catalyst comprising alumina which has been dried and impregnated with anhydrous hydrogen chloride for several hours at a temperature of from room temperature to 400° C.

8. A process for deoxygenating while simultaneously isomerizing a synthetic motor fuel containing olefins and oxygenated compounds obtained by the reaction of carbon monoxide and a hydrogen-containing gas which comprises passing said motor fuel at a temperature of from 300° to 600° C. over a catalyst comprising alumina impregnated with anhydrous hydrogen chloride, interrupting the passage of said motor fuel periodically and passing an oxygen-containing gas over the catalyst to remove carbon deposited thereon.

9. A process for deoxygenating while simultaneously isomerizing a synthetic motor fuel containing olefins and oxygenated compounds obtained by the reaction of carbon monoxide and a hydrogen-containing gas which comprises passing said motor fuel at a temperature of from 300° to 600° C. over a catalyst comprising alumina impregnated with anhydrous hydrogen chloride, interrupting the passage of said motor fuel periodically, passing an oxygen-containing gas over the catalyst, subsequently passing anhydrous hydrogen chloride over the catalyst and resuming the passing of said motor fuel.

10. A process for deoxygenating while simultaneously isomerizing a synthetic motor fuel containing olefins and oxygenated compounds obtained by the reaction of carbon monoxide and a hydrogen-containing gas which comprises passing said motor fuel at a temperature of from 300° to 600° C. over a catalyst comprising alumina impregnated with anhydrous hydrogen chloride and subsequently removing any chlorine from said motor fuel.

11. A process for deoxygenating while simultaneously isomerizing a synthetic motor fuel containing olefins and oxygenated compounds obtained by the reaction of carbon monoxide and a hydrogen-containing gas which comprises passing said motor fuel at a temperature of from 300° to 600° C. over a catalyst comprising alumina impregnated with anhydrous hydrogen chloride and subsequently removing any chlorine from said motor fuel by passing said motor fuel over bauxite at 200° to 500° C. and a space velocity of 0.1 to 30 volumes of motor fuel per volume of bauxite per hour.

CHARLES W. MONTGOMERY.
WILLIAM I. GILBERT.

REFERENCES CITED

The following references are of record in the file of this patent:

UNITED STATES PATENTS

| Number | Name | Date |
| --- | --- | --- |
| 2,397,639 | Berg et al. | Apr. 2, 1946 |
| 2,452,121 | Grahame | Oct. 26, 1948 |
| 2,471,647 | Oblad et al. | May 31, 1949 |

FOREIGN PATENTS

| Number | Country | Date |
| --- | --- | --- |
| 112,274 | Australia | July 3, 1939 |
| 735,276 | Germany | May 11, 1943 |